US005820512A

United States Patent [19]

Nakano

[11] Patent Number: 5,820,512

[45] Date of Patent: Oct. 13, 1998

[54] SHIFT CONTROL UNITS OF CONTINUOUSLY VARIABLE TRACTION ROLLER TRANSMISSIONS

[75] Inventor: Masaki Nakano, Yokohama, Japan

[73] Assignee: Nissan Motor Co., Ltd., Yokohama, Japan

[21] Appl. No.: 801,141

[22] Filed: Feb. 18, 1997

[30] Foreign Application Priority Data

Feb. 19, 1996 [JP] Japan .................................... 8-030417

[51] Int. Cl.$^{6}$ ...................................................... F16H 15/38

[52] U.S. Cl. ................................................. 476/10; 476/40

[58] Field of Search ................................. 476/10, 40, 41, 476/42

[56] References Cited

U.S. PATENT DOCUMENTS 4,960,004 10/1990 Hibi et al. ................................. 476/10

5,083,473 1/1992 Nakano ..................................... 476/10

FOREIGN PATENT DOCUMENTS 62-202564 12/1987 Japan .

63-92859 4/1988 Japan .

4-307152 10/1992 Japan .

*Primary Examiner*—Allan D. Herrmann

*Attorney, Agent, or Firm*—Foley & Lardner

[57] ABSTRACT

A shift control unit of continuously variable transmissions includes support members for rotatably supporting power rollers, pistons disposed to the support members at one end thereof, and links arranged to connect said support members. A connection is interposed between the support member and the piston and comprising between both ends a portion having a section determined such that the flexural rigidity in the thrust direction is smaller than the flexural rigidity in another direction.

14 Claims, 3 Drawing Sheets

SHIFT CONTROL UNITS OF CONTINUOUSLY VARIABLE TRACTION ROLLER TRANSMISSIONS

BACKGROUND OF THE INVENTION

The present invention relates generally to continuously variable traction roller transmissions and more particularly, to shift control units thereof.

Generally, the continuously variable traction roller transmission of the toroidal type comprises two toroidal transmission units, each including input and output disks oppositely disposed on a main axis or rotation axis and a pair of power rollers disposed to face each other across the rotation axis of the disks for power transmission through frictional engagement therewith. The two toroidal transmission units are disposed on the main axis in series such that the output disks have the backs close together.

The power rollers of the two toroidal transmission units are rotatably supported to trunnions, respectively. The trunnions have upper ends connected with each other by an upper link, and lower ends connected with each other by a lower link. This connection is so made that the trunnions can be moved along oscillation axes of the power rollers, each oscillation axis crossing a rotation axis of the power roller at right angles, so as to make the power rollers to be offset from the neutral position where the rotation axes of the power rollers cross the rotation axis of the disks, and that each power roller can inclinedly be rotated about the oscillation axis.

Concerning the shift control unit, for obtaining the above offset, shafts extending along the oscillation axes of the power roller are connected to the trunnions through pins, and pistons are engaged therewith. With the front toroidal transmission unit, the shaft of the trunnion and a boss of the piston for surrounding the shaft are arranged through a cylinder body for receiving the piston and a shift control valve body for generating working pressure of the piston. With the rear toroidal transmission unit, the shaft of the trunnion and the boss of the piston are arranged through the cylinder body.

When a shift control valve receives a speed-ratio command, the shift control valve body provides to the piston working pressure in accordance with the speed-ratio command. The piston urges the trunnion through the shaft to move along the oscillation axis of the power roller in accordance with the speed-ratio command to be offset from the neutral position. This produces inclined rotation of the power roller about the oscillation axis in the corresponding direction by component forces out of the input and output disks, obtaining stepless shifting by continuous change in the diameter of a circle defined by the power roller and the input and output disks being in contact therewith.

A precess cam is mounted to the shaft of the front trunnion at an end thereof protruding from the shift control valve body. The above offset and inclined rotation are fed back to the shift control valve of the shift control valve body through the precess cam and a shift link. This feedback urges the piston to make the trunnion to return to the initial position. And when the speed ratio corresponds to the speed-ratio command, the power roller is returned to the neutral position to maintain the speed ratio at a value corresponding to the speed-ratio command.

However, the known shift control unit can have the following problem since the shaft constituting a connection between the trunnion and the piston has great flexural rigidity over the overall length:

Consideration will be made with regard to power transmission between the input and output disks and the power roller. Due to the fact that power transmission is carried out through shearing of an oil film intervening between the input and output disks and the power roller, the power roller should be held between the input and output disks by great force corresponding to transmitted torque. Thus, the power roller undergoes great thrust to force the power roller out of a space between the input and output disks. In order to prevent lateral displacement of the trunnions even with the thrust, the trunnions have the upper ends laterally restrained by the upper link, and the lower ends laterally restrained by the lower link as described above.

Therefore, the trunnion is inevitably deformed on the upper and lower links due to the thrust, which causes inclination of the shaft and the piston. With the shaft having great flexural rigidity over the overall length, the shaft twisted is interfered with the inner peripheral face of the piston boss, producing great frictional force between the two. This frictional force not only causes biased wear of the piston and the piston boss to lower the durability thereof, but obstructs movement of the piston to lower the shift-control accuracy. This tendency is particularly remarkable when the piston boss is large in length as the piston boss corresponding to the front trunnion with the precess cam.

One solution to the problem is proposed by JP-A 4-307152 wherein a spherical joint serves to connect the connection between the trunnion and the piston to the trunnion so as to prevent twisting of the piston by deformation of the trunnion.

Another solution is proposed by JP-U 62-202564 wherein the connection between the trunnion and the piston is reduced in diameter to have a space with respect to the piston on the overall circumference, to which the piston is supported in the floating way by a spring so as to prevent twisting of the piston by deformation of the trunnion.

However, the solution proposed by JP-A 4-307152 is accompanied by cost up due to difficult forming of the spherical-joint connection, and does not allow the above feedback even with the precess cam arranged.

On the other hand, the solution proposed by JP-U 62-202564 is accompanied by considerable lowering of the torsional rigidity of the connection due to reduced diameter thereof on the overall circumference. Therefore, when the precess cam is mounted to the reduced-diameter connection, feedback of developed shifting and thus the shift control accuracy may be still inexact. Moreover, the sectional area is not sufficient for the reduced-diameter connection which undergoes tension due to hydraulic force.

It is, therefore, an object of the present invention to provide a shift control unit of continuously variable traction roller transmissions which contributes to improvement of the shift control accuracy without an increase in manufacturing cost.

SUMMARY OF THE INVENTION

According to one aspect of the present invention, in a continuously variable transmission:

- input and output disks coaxially oppositely disposed on an axis of the transmission;
- traction rollers disposed between said disks, each traction roller having a rotation axis and an oscillation axis which crosses said rotation axis at right angles;
- support members arranged to rotatably support said traction rollers;

pistons disposed to said support members at one end thereof, each piston urging said support member along said oscillation axis to make said traction roller to be offset from a neutral position where said rotation axis crosses said axis of the transmission;

links arranged to connect said support members, said links preventing displacement of said traction rollers by a thrust resulting from said input and output disks; and a connection interposed between said support member and said piston, said connection comprising between both ends a portion having a section determined such that flexural rigidity in a direction of said thrust is smaller than flexural rigidity in another direction.

Another aspect of the present invention lies in providing a shift control unit of a continuously variable transmission including input and output disks coaxially oppositely disposed on an axis of the transmission, and traction rollers disposed between the disks, each traction roller having a rotation axis and an oscillation axis which crosses the rotation axis at right angles, the shift control unit comprising:

support members arranged to rotatably support the traction rollers;

pistons disposed to said support members at one end thereof, each piston urging said support member along the oscillation axis to make the traction roller to be offset from a neutral position where the rotation axis crosses the axis of the transmission;

links arranged to connect said support members, said links preventing displacement of the traction rollers by a thrust resulting from the input and output disks; and a connection interposed between said support member and said piston, said connection comprising between both ends a portion having a section determined such that flexural rigidity in a direction of said thrust is smaller than flexural rigidity in another direction.

DETAILED DESCRIPTION OF THE INVENTION

Figure 1:
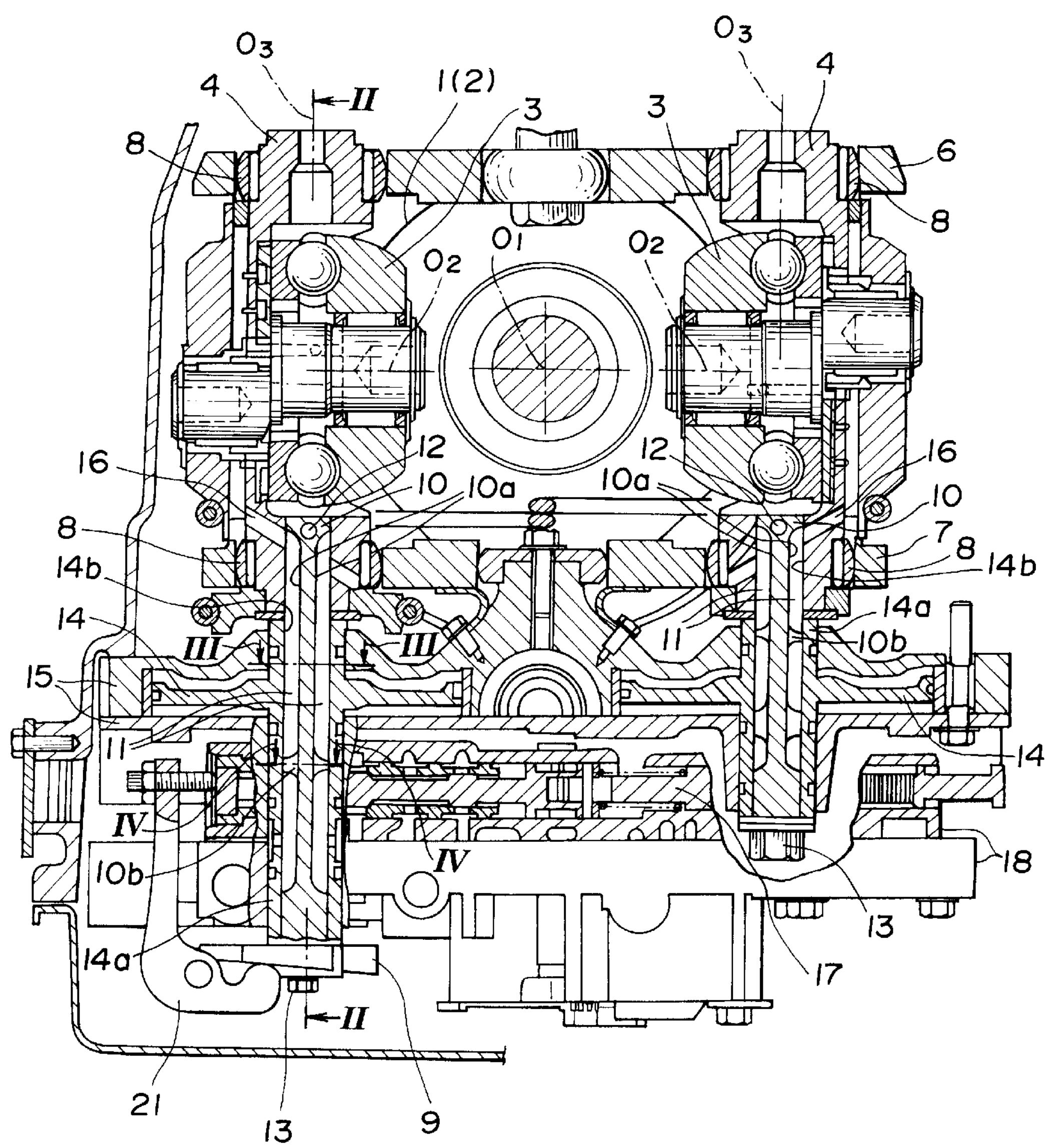
FIG. 1 is a cross section taken along the line I—I in FIG. 2, showing a preferred embodiment of a continuously variable toroidal transmission according to the present invention.
Figure 2:
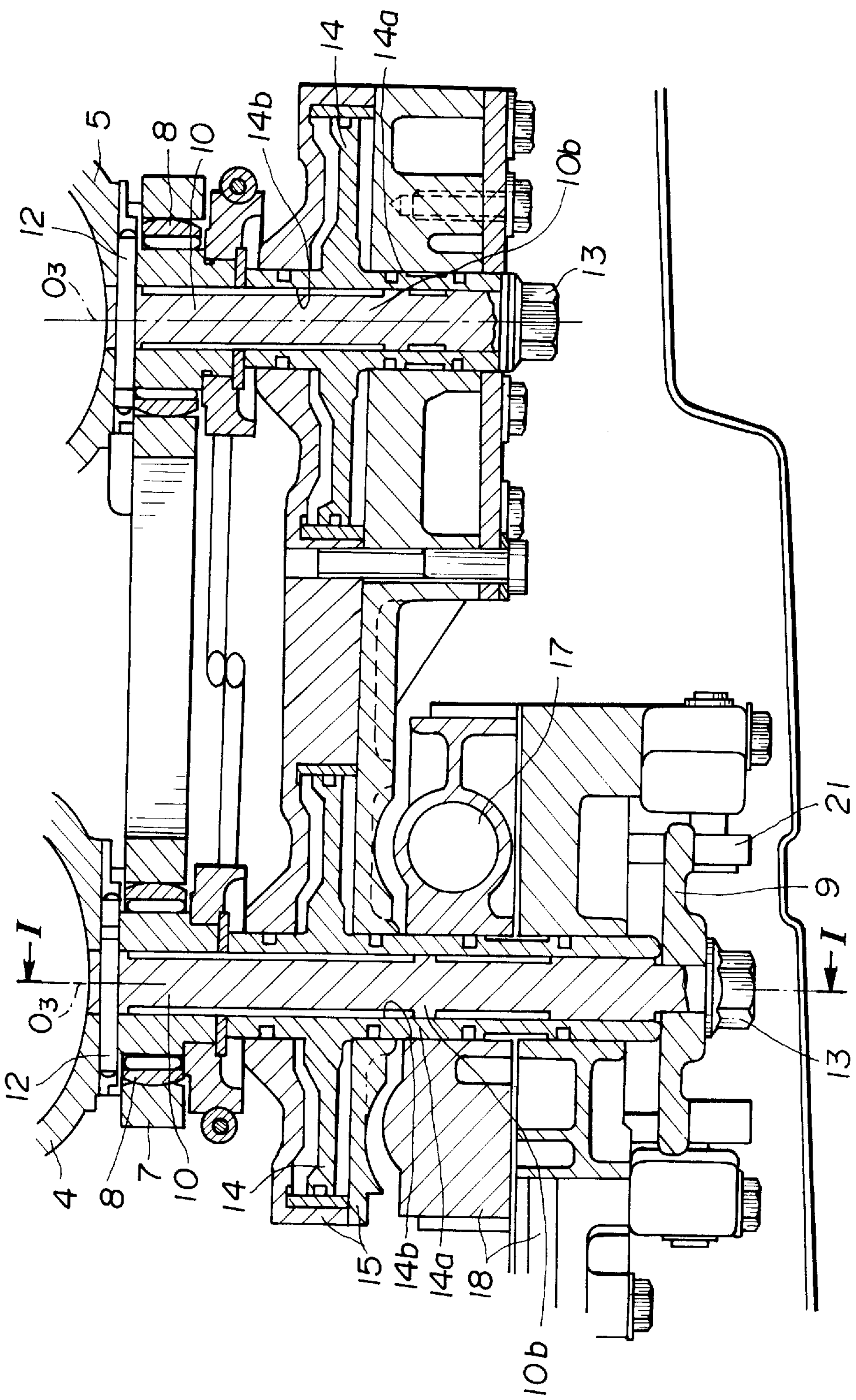
FIG. 2 is a longitudinal section taken along the line II—II in FIG. 1.

Referring to FIGS. 1–2, a continuously variable traction roller transmission embodying the present invention is of the double-cavity toroidal type comprising two toroidal transmission units.

Referring to FIG. 1, a front toroidal transmission unit comprises input and output disks 1, 2, a pair of power or traction rollers 3 oppositely disposed for power transmission through frictional engagement with the disks 1, 2, and trunnions or traction roller support members 4 for rotatably supporting the power rollers 3, respectively. A rear toroidal transmission unit comprises the same elements as those of the front toroidal transmission unit, including trunnions or traction roller support members 5 as shown in FIG. 2. The front and rear toroidal transmission units are constructed such that the output disks 2 have the backs close together and integrated with each other, and are coaxially disposed on a rotation axis $O_1$ of the disks 1, 2 (see FIG. 1) to equally transmit power to the input disks 1.

The trunnions 4, 5 have upper ends laterally restrained by upper links 6 having center portions pivotally supported, and lower ends laterally restrained by lower links 7 having center portions pivotally supported. Each trunnion 4, 5 and link 6, 7 are so connected by a spherical joint 8 that the corresponding trunnions 4, 5 can make strokes in the opposite directions along oscillation axes $O_3$ of the power rollers 3, each oscillation axis crossing a rotation axis $O_2$ of the power roller 3 at right angles, and that each trunnion 4, 5 can make inclined rotation about the oscillation axis $O_3$ together with the power roller 3.

Next, a shift control unit of the transmission will be described. For the strokes of the trunnions 4, 5, a shaft 10 extending along the oscillation axis $O_3$ of the power roller 3 is connected to a lower end of each trunnion 4, 5 through a pin 12. A piston 14 is engaged and integrated with the shaft 10 through a boss **14*a* held by a bolt 13 engaged with an end face of the shaft 10. Thus, the shaft 10 constitutes a connection between each trunnion 4, 5 and the piston 14**.

With the front toroidal transmission unit, the shaft 10 of the trunnion 4 and the boss **14*a* of the piston 14 for surrounding the shaft 10 are arranged through a cylinder body 15 for receiving the piston 14 and a shift control valve body 18 for generating working pressure of the piston 14. A precess cam 9 is mounted to the shaft 10 and the boss 14*a* at end faces thereof exposed from the shift control valve body 18 by a bolt 13**.

The shift control valve body 18 includes therein a shift control valve 17 which serves to provide to the piston 14 working pressure in accordance with a speed-ratio command. Thus, the piston 14 urges the corresponding trunnion 4, 5 through the shaft 10 to make a stroke along the oscillation axis $O_3$ of the power roller 3 to be offset from the neutral position as shown in FIG. 1 where the rotation axis $O_2$ of the power roller 3 crosses the rotation axis $O_1$ of the disks 1, 2. This produces inclined rotation of the power roller 3 about the oscillation axis $O_3$ in the corresponding direction by component forces out of the input and output disks 1, 2, obtaining stepless shifting by continuous change in the diameter of a circle defined by the power roller 3 and the input and output disks 1, 2 being in contact therewith.

During such shifting, the precess cam 9 arranged to the shaft 10 of the front trunnion 4 serves to feed back the stroke of the trunnion 4, 5 and the inclined rotation of the power roller 3 to the shift control valve 17 via a shift link 21. As shifting developed, this feedback urges the piston 14 to make the trunnion 4, 5 to return to the initial position. And when the speed ratio corresponds to a speed-ratio command, the power roller 3 is returned to the neutral position to maintain the speed ratio at a value corresponding to the speed-ratio command.

Figure 3:
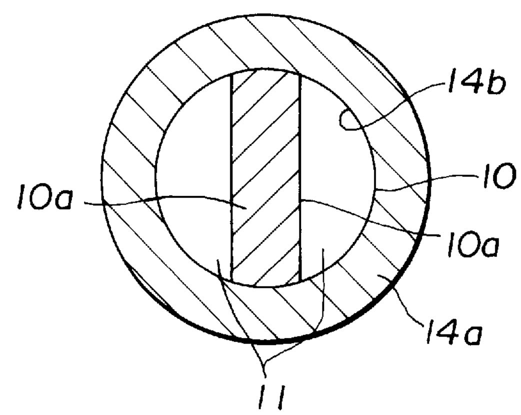
FIG. 3 is a view similar to FIG. 1, taken along the line III—III in FIG. 1.

Referring to FIG. 3, in this embodiment, the shaft 10 includes between both ends a portion having a substantially rectangular section with flat faces **10*a* arranged on both sides as viewed in the direction of the rotation axis $O_2$ of the power roller 3, i.e. in the direction of thrust which the power roller 3 receives from the input and output disks 1, 2. A semicircular space 11 is formed between each flat face 10*a* and an inner peripheral face 14*b* of the piston boss 14*a***.

That is, the shaft 10 has, between the end connected to the trunnion 4, 5 and the end engaged with the piston boss **14*a***, a non-circular section with smaller dimension in the direction of the power-roller rotation axis $O_2$ or in the thrust direction than that in the other direction perpendicular to the power-roller rotation axis $O_2$, resulting smaller flexural rigidity in the thrust direction than that in the other direction.

Thus, deformation of the trunnion 4, 5 on the links 6, 7 can be absorbed by flexural deformation of the non-circular section portion of the shaft 10, producing no inclination of the piston 14, resulting in solution to the problem of a reduction in the durability of the piston 14 twisted by deformation of the trunnions 4, 5 and the problem of lowered shift control accuracy. The shaft 10 is connected to the trunnion 4, 5 through the pin 12, so that, in any inclined position of the trunnion 4, 5, the flat face 10*a* of the shaft 10, i.e. the side of the shaft 10 with small flexural rigidity always corresponds to the direction of the power-roller rotation axis $O_2$ or in the thrust direction, obtaining the above effect regardless of the shift conditions.

Further, the flexural rigidity of the shaft 10 with non-circular section is not reduced in the other direction, obtaining minimum lowering of the strength of the shaft 10 with respect to twisting, etc. As a result, the above effect can be obtained without any inexactitude of feedback of the angle of inclination of the power roller 3 through the shaft 10, i.e. shift control accuracy.

Furthermore, the above effect can be obtained by simply forming the flat faces 10*a* between both ends of the shaft 10, and the semicircular space 11 between each flat face 10*a* and the inner peripheral face 14*b* of the piston boss 14*a*, producing no inconvenience of increased manufacturing cost.

Figure 4:
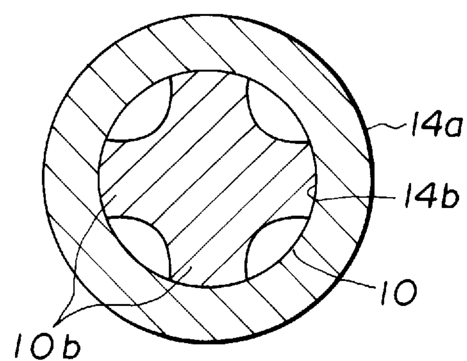
FIG. 4 is a view similar to Fig, 3, taken along the line IV—IV in FIG. 1.

Referring to FIG. 4, in this embodiment, the shaft 10 includes in a predetermined longitudinal position a radial guide portion 10*b* for restraining the non-circular section portion with respect to the inner peripheral face 14*b* of the piston boss 14*a* in all directions of a surface thereof perpendicular to an axis of the shaft 10.

The radial guide portion 10*b* of the shaft 10 serves to restrain a reduction in the flexural rigidity of the shaft 10 due to existence of the non-circular section thereof, the degree of restraint being variable with the set position of the radial guide portion 10*b*. Thus, the flexural rigidity of the shaft 10 in the thrust direction can optionally be determined by appropriate determination of the set position of the radial guide portion 10*b*, obtaining increased degree of freedom of the design, resulting in enlarged field of application.

Referring to FIG. 1, in order to use the semicircular space 11 formed between the flat face 10*a* of the shaft 10 and the inner peripheral face 14*b* of the piston boss 14*a* as a lubricating-oil passage for the power roller 3, a lubricating hole 16 is formed through the trunnion 4, 5 to ensure communication of the semicircular space 11 with a part of the power roller 3 to be lubricated.

Thus, there is no need to form the lubricating hole for the power roller 3 in the center of the shaft 10, obtaining reduced manufacturing cost. Moreover, the semicircular space 11 is positioned outside the lubricating hole 16 arranged in the center of the shaft as viewed in the radial direction thereof, resulting in easy and low-priced construction of a lubricating-oil circuit such as the lubricating hole 16.

Having described the present invention in connection with the preferred embodiment, it is noted that the present invention is not limited thereto, and various changes and modifications can be made without departing from the spirit of the present invention.

What is claimed is:

1. In a continuously variable transmission:

input and output disks coaxially oppositely disposed on an axis of the transmission;

traction rollers disposed between said disks, each traction roller having a rotation axis and an oscillation axis which crosses said rotation axis at right angles;

support members arranged to rotatably support said traction rollers;

pistons disposed to said support members at one end thereof, each piston urging said support member along said oscillation axis to make said traction roller to be offset from a neutral position where said rotation axis crosses said axis of the transmission;

links arranged to connect said support members, said links preventing displacement of said traction rollers by a thrust resulting from said input and output disks; and a connection interposed between said support member and said piston, said connection comprising between both ends a portion having a section determined such that flexural rigidity in a direction of said thrust is smaller than flexural rigidity in another direction.

2. A continuously variable transmission as claimed in claim 1, wherein said connection includes a shaft having one end mounted to said support member, and another end arranged through said piston.

3. A continuously variable transmission as claimed in claim 1, wherein said section of said portion of said connection is in a non-circular form.

4. A continuously variable transmission as claimed in claim 1, wherein said another direction is perpendicular to said direction of said thrust.

5. A continuously variable transmission as claimed in claim 3, wherein said section includes flat faces on both sides as viewed in said direction of said thrust.

6. A continuously variable transmission as claimed in claim 2, wherein said shaft includes in a predetermined longitudinal position a radial guide for restraining said portion with respect to an inner peripheral face of said piston in all directions of a surface thereof perpendicular to an axis of said shaft.

7. A continuously variable transmission as claimed in claim 6, wherein said connection and said inner peripheral face of said piston cooperate with each other to define a space which serves as a passage for lubricating oil for said traction rollers.

8. A shift control unit of a continuously variable transmission including input and output disks coaxially oppositely disposed on an axis of the transmission, and traction rollers disposed between the disks, each traction roller having a rotation axis and an oscillation axis which crosses the rotation axis at right angles, the shift control unit comprising:

support members arranged to rotatably support the traction rollers;

pistons disposed to said support members at one end thereof, each piston urging said support member along the oscillation axis to make the traction roller to be offset from a neutral position where the rotation axis crosses the axis of the transmission;

links arranged to connect said support members, said links preventing displacement of the traction rollers by a thrust resulting from the input and output disks; and a connection interposed between said support member and said piston, said connection comprising between both ends a portion having a section determined such that flexural rigidity in a direction of said thrust is smaller than flexural rigidity in another direction.

9. A shift control unit as claimed in claim 8, wherein said connection includes a shaft having one end mounted to said support member, and another end arranged through said piston.

10. A shift control unit as claimed in claim 8, wherein said section of said portion of said connection is in a non-circular form.

11. A shift control unit as claimed in claim 8, wherein said another direction is perpendicular to said direction of said thrust.

12. A shift control unit as claimed in claim 10, wherein said section includes flat faces on both sides as viewed in said direction of said thrust.

13. A shift control unit as claimed in claim 9, wherein said shaft includes in a predetermined longitudinal position a radial guide for restraining said portion with respect to an inner peripheral face of said piston in all directions of a surface thereof perpendicular to an axis of said shaft.

14. A shift control unit as claimed in claim 13, wherein said connection and said inner peripheral face of said piston cooperate with each other to define a space which serves as a passage for lubricating oil for said traction rollers.

* * * * *